3,303,154
COATING COMPOSITIONS
Keisuke Hirose and Masao Hasegawa, Yokohama, and Shinichi Fujimaki, Ashiya-shi, Japan, assignors to Nitto Chemical Industry Co., Ltd., Tokyo, Japan
Filed Oct. 14, 1963, Ser. No. 315,898
Claims priority, application Japan, Oct. 18, 1962, 37/45,179
7 Claims. (Cl. 260—29.6)

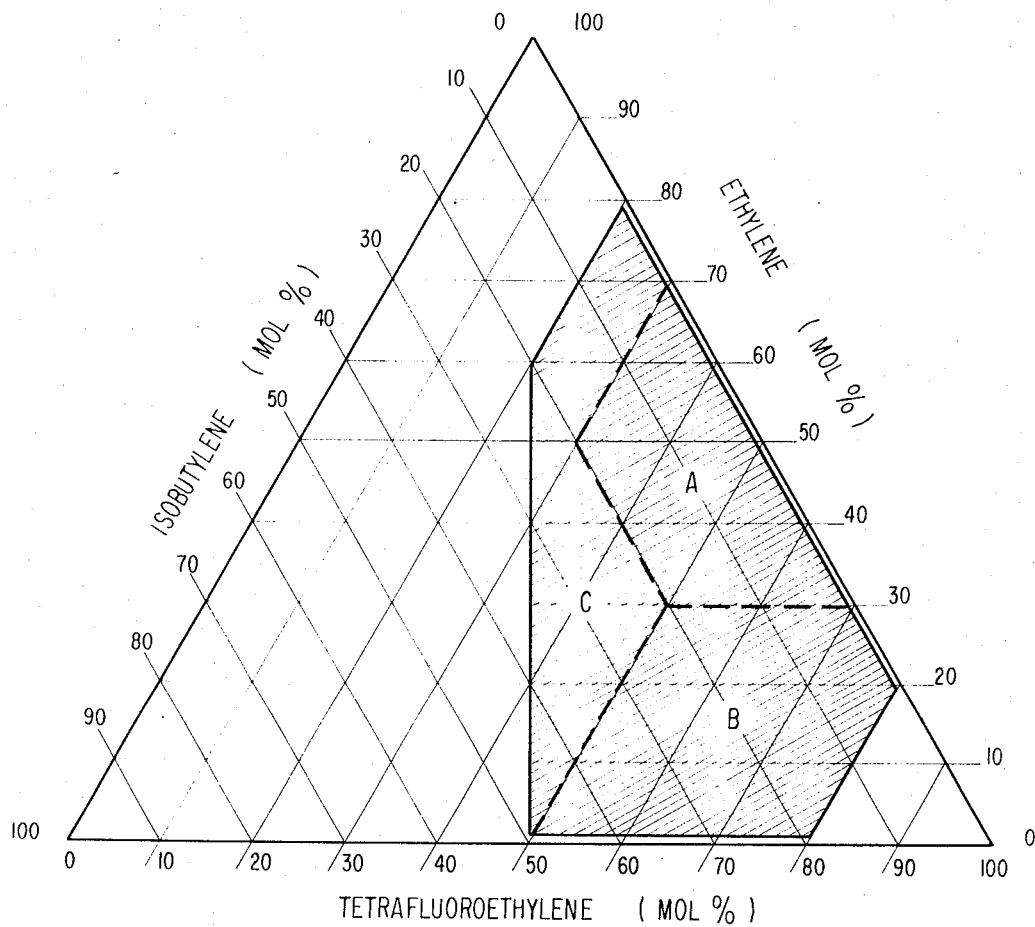
INVENTORS
KEISUKE HIROSE
MASAO HASEGAWA
SHINICHI FUJIMAKI

The present invention relates to an improved coating composition of a fluorine containing resin.

Hitherto, as one of surface treatments for metals and the like, coating by various resins has been utilized. In these coating materials, so-called fluorine containing resins, such as, polytetrafluoroethylene resin, polytrifluorochloroethylene resin and the fluorine containing copolymer resins thereof show excellent properties in chemical resistance and heat resistance, however since the fluorine containing resins have no general solvents that can be used at room temperature for coating the resins, the resins cannot be used for surface coating as coating materials in a solution state. In general, a process has been carried out wherein the finely granulated resin is dispersed in water or organic solvents, it is coated on the surface of a body, the body is heated to evaporate off the dispersing medium and the body is sintered in a furnace at above the melting point to weld the resin.

However, as these fluorine containing resins have a high viscosity at the melting point and the adhesion of the resins to the surface of metals and the like to be treated is poor, the coating operation is difficult. Since, in the polytetrafluoroethylene resin, it is necessary in general to use a harmful primer and the thickness of coated film in one operation is at most 0.01–0.02 mm. even if the primer is used, it is difficult to form coated film without pinholes. Moreover the adhesive power of the coated film on a surface is not too strong but also the film is peeled easily. While in the case of a copolymer resin of tetrafluoroethylene and hexafluoropropylene the adhesive property can be improved by using a primer, in order to obtain coated film of a useful thickness the coating process must be repeated several times, because the thickness of its coated film by one coating operation is thin. Also, since foams are liable to form locally in the case of spray coating, it requires great skill in operation. In the case of using a trifluorochloroethylene resin also, the thickness of the film by one coating operation is at most 0.1 mm. even if a primer is used and therefore, in order to obtain a desired thickness of coating of 0.3–0.5 mm. in, e.g., corrosion resisting coating of a reaction vessel, coating must be repeated several times.

When tetrafluoroethylene-ethylene copolymers, which contain 30–70 mol percent of ethylene, obtained by an emulsion polymerization in an aqueous medium containing a small amount of alcohol is dispersed in a dispersion medium and coating is carried out by using thus obtained dispersoid, a film having 0.1–0.2 mm. in thickness is formed by one coating operation without using a primer. However, as the sintering temperature of the copolymer resin is 280–290° C., and coated articles must be heated in air for a considerable time when the sizes of the articles are large, the coated film would be caused to discolor by oxidation of air.

A general object of this invention is referred with methods to obtain the coated film to metal substrate.

A further object of this invention is to obtain a coating dispersoid for forming coated film that can be used stably without trouble up to 150° C. and have sufficient resistances to all inorganic acids and organic solvents.

A still further object of this invention is to obtain a fluorine containing resin dispersoid that can be sintered at a lower temperature to prevent the degradation by air, besides fulfilling the above object. That is, the object is to lower the molding temperature or sintering temperature without reducing the heat resistance and chemical resistance.

The inventors have found that the above objects can be attained by using for coating a dispersoid prepared by dispersing in a known dispersing medium a three-component copolymer which is prepared by the emulsion polymerization of tetrafluoroethylene and ethylene with the addition of isobutylene. The amounts of tetrafluoroethylene, ethylene and isobutylene in the copolymer may be changed in a broad range according to the uses but for the objects of this invention, it is preferable to use the compositions in the domain shown by oblique lines in the attached drawing which shows a composition system of a three-component copolymer for coating. The compositions in the domain can be shown by the following expressions:

In the condition of $a+b+c=100\%$
$80\% \geq a \geq 20\%$
$a \geq c$
$b \geq 1.0\%$, $c \geq 1.0\%$ (wherein $a$, $b$ and $c$ show mol percent of tetrafluoroethylene, ethylene and isobutylene in a copolymer respectively).

Even in the above composition range, the physical properties of the resins are influenced by the compositions. The composition domain shown by the oblique lines in the drawing can be divided into three parts A, B, and C parts though they are not distinguished clearly. The resin in the A part has the physical properties similar to those of a tetrafluoroethylene-hexafluoropropylene copolymer resin. That is, it has an excellent resistance to organic chemicals, the melt viscosity of the resin at sintering temperature is very low, a flat film can be formed without pin holes from the resin even at sintering temperature of 250–270° C., the adhesion to metals is strong and coated film having the adequate thickness can be easily formed by one coating operation. As in the part B resin, which is a part containing a large amount of isobutylene and tetrafluoroethylene, the orientation of the main chain is disturbed by the influence of the methyl group in isobutylene, the second-order transition point of the resin obtained by the measurement of dynamic visco-elasticity is 50–100° C. which shows that the resin is in appearance softer than the resin in the A part. The resin in the B domain is superior to the resin in the A domain in resistivity to inorganic acids, and discoloration by fuming sulfuric acid is particularly low. Further, as the content of tetrafluoroethylene is high, the property not to stick on the surface of an article or non-tackiness is increased though adhesion is weakened to some extent.

The C part is the critical domain showing high adhesion and thick-film forming ability which are the great features of this invention in the case of coating metal surfaces, etc., by these three-component copolymer. In other part except A, B, and C, the properties of the resins are almost similar to those of polyethylene, though the presence of tetrafluoroethylene as comonomer contributes to increase resistance only. It has not particular influences on the increase of adhesivity. Further, in this domain the resistance to organic solvents is reduced, for example, the resins in this domain are dissolved at a high temperature in a solvent for polyethylene, such as xylene, so they show no novel properties as coating composition for chemical resistances even though they are a little resistant to chemical and heat compared to polyethylene resins.

That is, in only the domain shown by the oblique lines in the drawing are obtained coating composition having improved thick-film forming ability, strong adhesion to metal surfaces, heat resistance and chemical resistance.

In order to obtain such coating resins having the above-mentioned improved properties, it is necessary that the size of the resin particles is extremely small and the dispersoid of the resin is prepared easily, and for the purposes it is desirable to use a polymer prepared by an emulsion polymerization.

When the emulsion polymerization is carried out in an aqueous medium containing a small amount of an alcohol, the rate of polymerization is high and a stable latex can be obtained. For example, the following materials are placed in a 300 ml reaction vessel of stainless steel.

| | G. |
|---|---|
| Water | 150 |
| Tertiary butanol | 4.5 |
| Sodium borate | 0.15 |
| Ammonium persulfate | 0.15 |
| Ammonium salt of perfluorooctanoic | 0.3 |
| Dodecylmercaptan | 0.15 |

The vessel is closed and a gas mixture of tetrafluoroethylene and ethylene having a mol ratio of 50/50 added with 3 mol percent of isobutylene is introduced. The system begins to agitate at 75° C. and 68.5 atmosphere. The polymerization proceeds as well as the pressure is reduced. When the pressure of the system is reduced to 45 atmosphere, an additional gas mixture having the above composition is added into the system to increase the pressure to 68.5 atmosphere.

Such a process is repeated and after 50 minutes the agitation is stopped. Unreacted gases remaining in the polymerizing vessel are discharged, and the product is withdrawn. By the process, 218 g. of a milk-white stable latex containing 11.7 weight percent of a three-component copolymer is obtained. The composition of the obtained copolymer is determined by measuring the change of monomer compositions before and after the reaction by means of gas chromatography, elementary analysis and infrared ray absorption spectrum analysis of the copolymer. The latex particles were confirmed by an electron microscopic observation to be homogeneous spherical particles of 0.05–0.15 m$\mu$ in diameter.

By aggregation and drying in the subsequent treatments, the particles of 0.05–0.15 m$\mu$ in diameter in the dispersoid are aggregated into particles of 3 to 5 m$\mu$ in diameter. Thus a particle size of the copolymer is not easily obtained without the use of the emulsion polymerization and by using the copolymer prepared by the emulsion polymerization, the stable dispersoid of the copolymer can be prepared easily.

The latex of the copolymer obtained by the above-mentioned process may be mixed with emulsion stabilizing agents, concentrated and coated on the surface of an article by spraying or dipping as an aqueous dispersoid. But, it is preferable for surface coating to separate the copolymer by solidfying the latex, drying the separated copolymer and then dispersing the copolymer in a volatile organic solvent.

For example, the latex prepared by the above-mentioned polymerization method is solidified by a freezing process, washed with hot water and an alcohol, and dried in vacuo at 50° C. to afford 25 g. of the white powder of the three-component copolymer. The polymer powder is, in a concentration of 10 to 50 weight percent, added into an organic dispersing medium, such as, alcohols, e.g., methanol, ethanol, propanol, butanol and cyclohexanol; esters, e.g., ethyl acetate, butyl acetate and amyl acetate; ketones, e.g., acetone, methyl ethyl ketone, methyl isobutyl ketone and cyclohexanone; aromatic hydrocarbons, e.g., benzene, xylene and toluene; and halogenated hydrocarbons, e.g., carbon tetrachloride, trichloroethane, trichloroethylene and perchloroethylene.

The mixture is then agitated in an agitator capable of high-speed agitation to give a dispersoid suitable for coating. Further, if the volatile rate of the above-described organic medium is too high, the medium may be used as a two-component dispersing medium by the addition of 5 to 30 weight percent of a high boiling point material such as cyclohexanol. Also, in order to prevent the oxidation and discoloration of the polymer at the sintering temperature, stabilizers or antioxidants of 0.1 to 5.0 weight percent based on the polymer may be added. As various pigments, reinforcing agents and additives, carbon black, inorganic oxides or fine particles, etc., may be added. By the results of our experiments it has been found that a dispersoid of a mixture of a mixed solvent of 9 parts by weight of carbon tetrachloride and 1 part by weight of cyclohexanol, and 15 to 20% by weight of the three-component copolymer powder obtained by the above-mentioned method containing 1% by weight based on the resin of dicyclohexylamine is particularly suitable as a coating dispersoid by spraying and dipping.

The coated film obtained from thus prepared dispersoid show strong adhesion that has never been obtained by conventional polyethylene or polytetrafluoroethylene resins. In other words, the film coated by spraying on iron plates, aluminum plates or stainless steel plates adheres strongly to the surface of the metal without applying any surface treatment afterward and it is impossible to peel off by means of a knife or a blade the resin film from the contact surface. While the three-component copolymer has a small dielectric loss similar to that of a polytetrafluoroethylene resin in a broad frequency range and the copolymer is considered to be a non-polar polymer, it adheres strongly to metals. It is not clear that the adhesive property of a resin film is influenced by only physical adhesion caused by the surface condition of a metal to be coated or by chemical bonding besides, but polyethylene coated film can be peeled by means of knives, polytetrafluoroethylene coating can be easily peeled off even by using a primer, and tetrafluoroethylene-hexafluoropropylene copolymer coated film can be, even though it adheres comparatively strongly by using a primer, peeled from the contact surface by means of a knife or a blade. On the other hand, coating by the three-component copolymer by this invention shows excellent adhesion, which is a great feature of this invention. Further, other features of this invention is that since a dispersoid containing the material subjected to a specific treatment as sealer (primer) as in the case of other fluorine containing resins is unnecessary in this invention, the resin obtained by this invention is dispersed by using a low-price and general dispersing medium having almost no corrosive action and dangerous property without necessity of any treatment for increasing the adhesion of the resin dispersoid. Also, as shown in the later examples, such thickness of coated film formed by one spraying or dipping step is one that has never been seen in coatings by conventional synthetic resins containing fluorine. The usual thickness of coated film by one coating operation in this invention is 0.15 to 0.2 mm. and after the first coating operation, coated film of 0.2 to 0.3 mm. can be formed by each additional coating operation. Therefore, a practical coated film thickness of 0.35 to 0.5 mm. can be obtained by only two coating operations. By reducing the number of the coating operations the operation time and consequently heating time are reduced, and then the deterioration of the resin, which is caused by degradation of polymer molecules at high temperature, can be prevented. Such a property is not seen in conventional fluorine containing resins, and it is also one of the features of this invention that such a fluorine containing resin coated film having improved heat resistance and chemical resistance can be formed easily and with a low cost.

In the three-component copolymer of this invention, the melting temperature can be reduced without changing substantially the thermal decomposition temperature of a two-component copolymer of tetrafluoroethylene and ethylene. By the results of measuring the melting point of the resins by a differential thermal analysis, the copolymer of this invention does not show a distinct melting point as seen in high density polyethylene or polytetrafluoroethylene but the melting point of a two-component copolymer of tetrafluoroethylene and ethylene in a 40/60 mol ratio is from 240 to 250° C. and that of the three-component copolymer added with 3 mol percent of isobutylene is from 210–230° C.

On the other hand, as the thermal decomposition temperature of both copolymers are about 290° C. and the sintering temperature can be lowered in the case of the three-component copolymer, the heat deterioration can be prevented. Further, as the copolymer can be sintered at a comparatively low temperature, the antioxidation effect by dicyclohexylamine, etc., can be increased more remarkably. In addition, near the melting point the viscosity of the three-component copolymer is reduced to one severalty by the addition of isobutylene. Due to these reasons, the three-component copolymer of this invention can easily afford a flat coated film having no pin holes even by sintering almost without being affected by the thermal decomposition.

The dispersoid by this invention is in particular useful for surface coating of metals, such as, iron, aluminum, stainless steel and the like, but a film of the copolymer can be produced by coating the copolymer on a base material, such as glass plates, and peeling by a suitable method.

The examples of this invention are as follows:

*Example 1*

The following materials were placed in a horizontal agitation type polymerizing vessel of 10 l. in inside volume.

|  | Parts |
| --- | --- |
| Water | 6,300 |
| Tertiary butanol | 190 |
| Sodium borate | 32.5 |
| Ammonium persulfate | 6.5 |
| Potassium salt of perfluorooctanoic acid | 13.0 |
| Dodecylmercaptan | 6.5 |

After closing the vessel and completely purging air from the vessel, a mixed gas of tetrafluoroethylene and ethylene in a mol ratio of 40:60 together with 3 mol percent of isobutylene was introduced into the vessel. When the system was agitated at 70° C. and 30 atmosphere, the polymerization proceeded and the pressure was reduced. Then an additive gas mixture having the above composition was added into the system to maintain the pressure to 30 atmosphere at 70° C. After 2 hours, the agitation was stopped, gases in the vessel were removed and the product was withdrawn. A translucent, milk-white and stable aqueous emulsion was obtained. The emulsion was solidified by freezing and the thus obtained solid was washed with warm water and warm alcohol 2 times each with stirring and dried for one day at 120° C. to give 1,100 parts of the white finely-divided solid.

50 g. of thus obtained three-component copolymer resin powder, 180 g. of carbon tetrachloride, 20 g. of cyclohexanol and 0.5 g. dicyclohexylamine were mixed by means of a domestic mixer to afford the coating dispersoid. The dispersoid was spray-coated on the filed surface of an aluminum plate (50 x 100 x 3 mm.$^3$) by means of a spray gun of 0.7 mm. in an aperture by utilizing an air pressure of 25 kg./sg. cm. and after evaporating off the dispersion medium by maintaining the plate for 10 minutes at 150° C., the plate was placed for 15 minutes at 260° C. in a sintering furnace to give a flat resin coated film of 0.15–0.20 mm. in thickness of the three-component copolymer on the surface of the aluminum plate. By repeating the same process 2 times, the resin film of 0.3–0.4 mm. in thickness having no pin holes was obtained and by repeating 3 times the film of 0.5–0.6 mm. having no pin holes was obtained. The film could not be peeled off by means of a knife or a blade.

*Example 2*

A sand-blasted iron plate (50 x 100 x 2 mm.$^3$) was dipped in the dispersoid obtained in Example 1. The plate was withdrawn slowly, dried for 10 minutes at 150° C. and sintered for 15 minutes at 260° C. to afford flat coated film of 0.1 mm. in thickness having no pinholes.

*Example 3*

Steel plates (50 x 100 mm.$^2$) of 2 mm. in thickness bent into an L shape (the radius of curvature was about 1.5 mm.) were coated with the dispersoid obtained in Example 1 and, with a dispersoid of a copolymer of tetrafluoroethylene and hexafluoropropylene. At that, the surfaces of the steel plates were cleaned with solvent but other surface treatment by, e.g., sand-blast or emery cloths was not applied.

The coating conditions and the properties of the obtained resin coated film were as follows:

|  | Dispersoid | | |
| --- | --- | --- | --- |
|  | A | B | C |
|  | Tetrafluoroethylene-ethylene-isobutylene copolymer (same as in Example 1) | Tetrafluoroethylene hexafluoropropylene copolymer dispersoid | Same as (B) |
| Primer | Not used | Used | Not used. |
| Spraying No | 4 times | 4 times | 4 times. |
| Film thickness | 0.40–0.45 mm | 0.20–0.25 mm | 0.20–0.25 mm. |
| Appearance of the film | No pinholes | No pinholes. Locally some foams at the bent part. | No pinholes. |

The resin coated film in the case C wherein no primer was used began to peel 1 day after sintering from the metal surface at the bent part and the edges. It was considered that the shrinking power of the resin by cooling was stronger than the adhesive power. The adhesion to the metals of the coated film in cases A and B was very strong and when a heat treatment of heating for 30 minutes at 150° C. and then quenching in cold water was repeated 10 times, no changes were observed. When the coated film in case C was lined by a blade, the film was peeled easily as a band. In case B, the resin could be peeled from the contact surface even though it was not so easy as case C, while it was completely impossible to peel the film in case A.

*Example 4*

Aluminum rods of 10ϕ x 50 mm. were coated with the dispersoid shown in Example 1 and with, as comparison, a dispersoid of a trifluorochloroethylene resin by spray coating to form film of 0.4 mm. in thickness. The coating conditions and the properties of film were as follows:

| | Dispersoid | |
|---|---|---|
| | A | B |
| | Tetrafluoroethylene-ethylene-isobutylene copolymer dispersoid (same as in Example 1) | Trifluorochloroethylene resin dispersoid |
| Coating No | 2 times | 5 times (containing primer application). |
| Film thickness | 0.4 mm | 0.4 mm. |
| Chemical resistance (immersed for 10 hrs. in boiling xylene contg. 5% HCl). | Slightly swollen | Dissolved. |

The times of coating treatment were reduced in the case of using the dispersoid of this invention while the chemical resistance of the film was excellent.

What is claimed is:

1. A resin copolymer dispersoid composition suitable for coating consisting of particles of a three-component copolymer prepared by an emulsion polymerization of tetrafluoroethylene, ethylene and isobutylene and having the composition in the range of 20–80 mol percent of tetrafluoroethylene, 20–80 mol percent of ethylene, and 1–49% isobutylene and within the shaded area of FIG. 1 dispersed in an aqueous medium.

2. A resin copolymer dispersoid composition as in claim 1 having the composition in the area A shown in FIG. 1.

3. A resin copolymer dispersoid composition as in claim 1 having the composition in the area B shown in FIG. 1.

4. A resin copolymer dispersoid composition as in claim 1 having the composition in the area C shown in FIG. 1.

5. A process of producing a copolymer dispersoid composition of tetrafluoroethylene, ethylene and isobutylene by emulsion polymerization in an aqueous medium comprising reacting at a pressure of at least 30 atms. and at a temperature of 70–75° C. in the presence of water a gaseous mixture of 20–80 mol percent tetrafluoroethylene, 20–80 mol percent ethylene and 1–49 mol percent isobutylene for a period of several hours until the reaction is complete and recovering said copolymer from the reaction vessel.

6. A process as in claim 5, wherein the emulsion polymerization is carried out in an aqueous medium containing a small amount of alcohol.

7. A process as in claim 5, wherein said recovery process is effected by freezing the copolymer, washing it and then drying in vacuum to result in a finely divided solid.

References Cited by the Examiner

FOREIGN PATENTS 588,590 5/1947 Great Britain.
588,697 5/1947 Great Britain.
680,257 10/1952 Great Britain.

MURRAY TILLMAN, *Primary Examiner.*

J. L. WHITE, *Assistant Examiner.*